Aug. 17, 1954  L. H. MORIN  2,686,338
MACHINE FOR PRODUCING REINFORCED PLASTIC SCOOP STRINGERS
Filed March 8, 1952
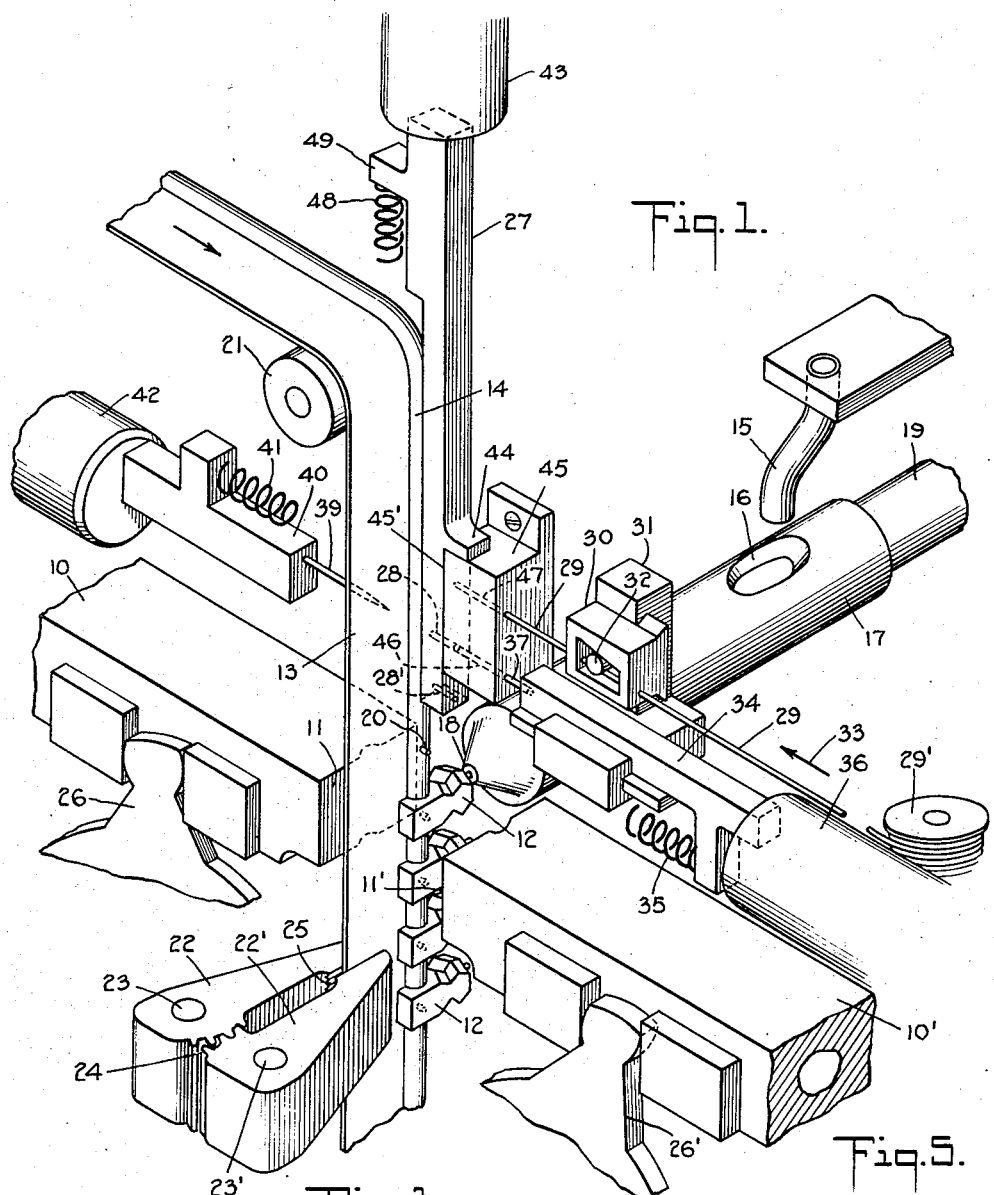
INVENTOR
LOUIS H. MORIN
BY
ATTORNEY Patented Aug. 17, 1954

2,686,338

UNITED STATES PATENT OFFICE 2,686,338

MACHINE FOR PRODUCING REINFORCED PLASTIC SCOOP STRINGERS

Louis H. Morin, Bronx, N. Y.

Application March 8, 1952, Serial No. 275,640

15 Claims. (Cl. 18—1)

This invention relates to machines for producing separable fastener stringers. More particularly, the invention deals with a machine of this type and kind, wherein reinforcing and positioning members are first formed and mounted on the edge portion of a stringer tape at predetermined spaced intervals, after which scoops are die cast on the tape edge at said intervals to envelop said members, the stringer being automatically produced in a successive series of machine operation.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic or schematic perspective view of the various parts of a machine for producing fastener stringers of the kind under consideration, illustrating only parts of the mechanisms with part of the construction in section and showing the scoop forming dies in open position.

Fig. 2 is a diagrammatic sectional view showing the first step in the cycle of machine operation of projecting a strand-like member into a shearing and delivery tool.

Fig. 3 is a view, similar to Fig. 2, diagrammatically showing the parts in a different position and illustrating the piercing of the stringer tape.

Fig. 4 is a view, similar to Fig. 3, showing the piercing tool retracted and the reinforcing and positioning member mounted in the pierced part of the tape; and Fig. 5 is a diagrammatic sectional view illustrating the formation of a scoop around a reinforcing member mounted in the tape.

To simplify and clarify the illustration of my improved machine, the same has been shown in the accompanying drawing in a diagrammatic or schematic manner and the various means for actually operating the parts, members or devices of the machine have been omitted as these, in themselves, form no specific part of the present conception.

In the drawing, 10, 10' represent a pair of die casting dies, adjacent surfaces 11, 11' of the dies having impressions or cavities for forming a die cast scoop 12 on a stringer tape 13 and preferably the beaded edge 14 of the tape. No attempt is made to illustrate the contour of the cavity on the die surfaces, as this forms no specific part of the present invention, nor is the actual shape or structure of the scoops 12 of any specific significance, except that they are of such structure as to produce the desirable interlocking characteristics in producing separable fastener stringers and can be formed by injection moulding or die casting in the manner illustrated. For example, scoops, as disclosed in my prior application Ser. No. 241,033; filed August 9, 1951, could be produced.

While any type or kind of casting material could be utilized in forming the scoops 12, in the accompanying drawing I have diagrammatically illustrated the production of plastic scoops, where a suitable plastic material is fed through a tube 15, into the opening 16 of a cylinder 17, the material being heated in the forward portion of the cylinder in manners well known in the art and discharged from the nozzle 18 by a plunger or the like 19 actuated by air, mechanically or in any other desired manner. In the present presentation, I have in mind the formation of nylon scoops 12 and, in Fig. 5, I have shown the scoop as enveloping a reinforcing and positioning member or element 20 which passes through and is supported in the beaded edge 14 of the tape 13.

In the automatic machine which is diagrammatically shown, the tape 13, from a source of supply, is passed down over a guide roller 21 for positioning between the surfaces 11, 11' of the dies 10, 10'. The tape also passes between a pair of tape grippers and feeders 22, 22' to intermittently engage and feed the tape step by step in controlling the spacing between the members 20, fixed and positioned on the tape, and also to control the normal spacing of the tape between what are generally termed stringer lengths constituting part of a more or less endless tape structure.

It is well known in the art that separable fastener stringers are produced by fixing a predetermined number of adjacent scoops on an edge of the stringer tape to define what is termed a stringer length and, between each stringer length, there is a blank spacing of the tape for handling and attaching the stringers to various supports and common or known means is employed to actuate the grippers and feeders 22, 22' to provide the respective feeds of the tape.

The grippers 22, 22' operate on pivots, as at 23, 23', and are geared together, as seen at 24, so that the same may be actuated to separate the roughened gripper jaws 25 to clear the tape in the free movement of the grippers relatively to the tape. It will be apparent that the grippers move freely upwardly over the tape, then grip the tape and feed the tape downwardly for the respective positionings of the tape.

In the drawing, I have indicated at 26, 26' levers for actuating the dies 10, 10' to control movement thereof into closed and opened positions. Any suitable means can be employed for actuating said levers to control die operation.

At 27 I have shown what might be termed a shearing and delivery slide or tool, which is disposed at one side of the stringer tape, or the beaded edge 14 thereof, as noted in Figs. 2 to 4, inclusive, the slide having, at its lower end portion, a transverse bore or aperture 28, into which a wire or other strand 29 is adapted to be positioned by a strand feeding and gripping unit 30 in the form of a slide mounted in a block or frame 31. The unit 30 includes a suitable automatic wire gripper 32, generally known in the arts which, in the movement of the slide 30 in the direction of the arrow 33, will grip and feed the wire to project the same a predetermined distance into the slide 27, as noted in Fig. 2 of the drawing and, upon moving in a direction opposite to the arrow 33, the member 32 will disengage the wire or strand 29 and move freely thereover. Also mounted in the block 31 is a plunger slide 34 normally held in inoperative position by a spring, as diagrammatically indicated at 35, and moved forwardly by an air cylinder, part of which is diagrammatically shown at 36, to move a pin 37 of the plunger 34 so as to feed the reinforcing and positioning element 20 into the tape bead, in the manner diagrammatically illustrated in Fig. 4.

Prior to moving the element 20 into the tape bead, the tape bead 14 is pierced to form an aperture 38 therein by a piercing tool or needle 39, note Fig. 3. The needle 39 constitutes part of another plunger 40 which is actuated by a spring, as diagrammatically seen at 41, into its retracted or inoperative position and an air cylinder, diagrammatically seen, at 42, is employed to move the needle 39 into the operative position, as shown in Fig. 3, to pierce the bead 14 to form the aperture 38 therein. In piercing the tape bead 14, the needle 39 first passes through a stripper plate 39' shown only in Figs. 2, 3 and 4 and also into an aperture 28' in the slide 27, note Fig. 3.

In movement of the needle 39 from the position shown in Fig. 3 to the position shown in Fig. 4, plate 39' serves to back the bead 14 in the stripping operation.

The wire or strand 29 comes from a reel or spool, part of which is shown at 29' in the drawing and it will thus be seen that, by maintaining the source of supply of the tape 13, wire or strand 29 and a constant delivery of the plastic material into the cylinder 17, a substantially continuous automatic operation of the machine can be performed.

As the tape is pierced by the needle 39, the wire strand 29 has been advanced into the aperture 28, as shown in Fig. 3, and then, after the needle has been withdrawn, the slide 27 moves downwardly to the position shown in Fig. 1 and also indicated in Fig. 4 of the drawing, the slide 27 being actuated by an air cylinder diagrammatically shown in part at 43. This downward movement of the slide 27 serves to shear a piece from the strand 29, which piece constitutes the element 20, and the movement continues until the stop 44 of the slide 27 engages the block 45. In this position of the slide 27, the bore or hole 28, having element 20 therein, is in alinement with the plunger and the retracted piercing needle 39. Now, the plunger pin 37, actuated by the air cylinder 36, is moved from the position shown in Fig. 3 to that shown in Fig. 4 to feed the element 20 into the position shown in said figure within the aperture 38 in bed 14 and so positioning the element 20 on the tape bead that the ends 20' of the element protrude beyond side surfaces of the bead 14. The element ends 20' pass through grooves 27' in slide 27 and 39'' in stripper plate 39' in feeding the tape bead 14 downwardly.

It will, thus, be seen that, when the scoop 12 is cast or injection moulded onto the tape bead, the portion 12' of the scoop arranged upon the tape bead will completely envelope the ends 20'' of the element 20.

In the foregoing operation, it will be understood that the pin 37 has a support and guide in an aperture 46 in the block 45. In like manner, the strand or wire 29 has a support or guide in the block 45, as indicated at 47. The slide 27 moves snugly on or over the surface 45' of the block 45 to establish a shearing operation of the strand.

After the element 20 has been positioned in the tape bead, the plunger pin 37 is retracted to the position clearing the slide 27 and a spring, diagrammatically shown at 48, then moves the slide 27 upwardly until a stop 49 strikes the cylinder 43, thus positioning the aperture 28 in alinement with the aperture 47, whereupon another section of the strand or wire 29 can be fed into the aperture 28, the slide 27 again moved downwardly by the air cylinder 43 to shear the element 20 from the strand or wire stock and deliver the same to position in alinement with the plunger 37. With the latter movements the parts of the machine are in the position first above described, and this cycle of operation is repeated.

As the tape 13 is fed downwardly to bring a new section thereof into position to receive the next successive element 20, previously applied elements are fed downwardly until one of such elements assumes a position between adjacent surfaces of the dies 11, 11' and, during the cycle of operation of forming the element 20, piercing the tape and feeding the element onto the tape bead, a scoop 12 is formed on one of the previously applied elements in the manner which is diagrammatically illustrated. In the accompanying drawing, two of the elements 20 are disposed between what may be termed the element attaching or fixing station and the casting or moulding station. However, this distance or spacing may be varied to suit different requirements. The size of the scoops and spacing of the elements 20 is schematically shown for sake of clarity, it being understood that, in many instances, the scoops are relatively small and are positioned in close proximity to each other.

In connection with the feed of the strand or wire 29 into the slide, here again, the degree of this feed will govern the ultimate length of the member or element 20 to be formed and this will further be determined by the dimensions of the tape bead and the scoop to be formed thereon. The degree of extension of the protruding ends 20', as noted in Fig. 5 of the drawing, can be varied and here it should also be kept in mind that there is a slight compression or squeezing of the tape bead in the application of the moulded or cast product thereon which, in itself, would extend the ends 20' into the product to a greater degree than said ends normally would protrude beyond the surfaces of the bead 14.

The elements 20 are referred to as reinforcing or positioning elements. In other words, they serve to reinforce and strengthen the attachment of the scoop or other product to the tape or other mounting member and, at the same time, position and space the scoops or other products on the tape or mounting in the spacing controlled by the tape feed and this latter will be controlled by means governing the feed motion of the grippers 22, 22'.

While the diagrammatic showing of my machine has been illustrated in the production of what are known as separable fastener stringers, it will be apparent that the machine can be utilized for forming, reinforcing and positioning die cast or injection moulded products on any type or kind of a mounting. It will also be apparent that the shape and contour of the members or elements 20 can be varied to suit different uses.

In the operation of the machine, it will be understood that the grippers 22 engage and feed the tape when the dies are in open position. On the other hand, when the dies are closed and support the tape firmly, the grippers at this time are opened and moved vertically with respect to the tape the desired distance and again grip the tape firmly and, in this way, a positive control of tape feed is maintained at all times.

Having fully described my invention, what I claim as new and desire to secure by Letters Patent is:

1. A machine for producing reinforced scoops on mounting members, comprising means for guiding a mounting member through a predetermined path in the machine, means for intermittently feeding the mounting member at predetermined distances in the machine, means for feeding a strand into position adjacent the mounting member to define a strand feeding station, means at said station to receive a length of strand and to shear the strand to form a reinforcing element, a piercing tool spaced with respect to said strand and movable through said mounting member to form an aperture therein at a piercing and assemblage station spaced longitudinally of the mounting member with respect to said strand feed station, said strand shearing means being adapted to deliver a severed reinforcing element to said last named station in alinement with the aperture formed in the mounting member, a plunger at said last named station for feeding the element into the aperture of the mounting member and positioning the same thereon, a pair of dies movable toward and from the mounting member at a position spaced longitudinally of the mounting member with respect to the piercing and element mounting station and forming a moulding station, the dies having a cavity defining the contour of the scoop to be formed on said mounting member, and means for pressure injecting moulding material into the cavity at said station to form a scoop on the mounting and enveloping the preattached reinforcing element on said mounting member.

2. A machine for producing reinforced scoops on mounting members, comprising means for guiding a mounting member through a predetermined path in the machine, means for intermittently feeding the mounting member at predetermined distances in the machine, means for feeding a strand into position adjacent the mounting member to define a strand feeding station, means at said station to receive a length of strand and to shear the strand to form a reinforcing element, a piercing tool spaced with respect to said strand and movable through said mounting member to form an aperture therein at a piercing and assemblage station spaced longitudinally of the mounting member with respect to said strand feed station, said strand shearing means being adapted to deliver a severed reinforcing element to said last named station in alinement with the aperture formed in the mounting member, a plunger at said last named station for feeding the element into the aperture of the mounting member and positioning the same thereon, a pair of dies movable toward and from the mounting member at a position spaced longitudinally of the mounting member with respect to the piercing and element mounting station and forming a moulding station, the dies having a cavity defining the contour of the scoop to be formed on said mounting member, means for pressure injecting moulding material into the cavity at said station to form a scoop on the mounting and enveloping the preattached reinforcing element on said mounting member, and said tape feeding means being adapted to feed the tape during a predetermined number of cycles of operations of the machine in intermittent feeds equal to the spacing between the first named stations.

3. A machine for producing reinforced scoops on mounting members, comprising means for guiding a mounting member through a predetermined path in the machine, means for intermittently feeding the mounting member at predetermined distances in the machine, means for feeding a strand into position adjacent the mounting member to define a strand feeding station, means at said station to receive a length of strand and to shear the strand to form a reinforcing element, a piercing tool spaced with respect to said strand and movable through said mounting member to form an aperture therein at a piercing and assemblage station spaced longitudinally of the mounting member with respect to said strand feed station, said strand shearing means being adapted to deliver a severed reinforcing element to said last named station in alinement with the aperture formed in the mounting member, a plunger at said last named station for feeding the element into the aperture of the mounting member and positioning the same thereon, a pair of dies movable toward and from the mounting member at a position spaced longitudinally of the mounting member with respect to the piercing and element mounting station and forming a moulding station, the dies having a cavity defining the contour of the scoop to be formed on said mounting member, means for pressure injecting moulding material into the cavity at said station to form a scoop on the mounting and enveloping the preattached reinforcing element on said mounting member, said tape feeding means being adapted to feed the tape during a predetermined number of cycles of operations of the machine in intermittent feeds equal to the spacing between the first named stations, and means for checking movement of said strand shearing means to aline the same with respect to the first and second named stations.

4. A machine for producing reinforced scoops on mounting members, comprising means for guiding a mounting member through a predetermined path in the machine, means for intermittently feeding the mounting member at predetermined distances in the machine, means for feeding a strand into position adjacent the mounting member to define a strand feeding station, means at said station to receive a length of strand and to shear the strand to form a reinforcing element, a piercing tool spaced with respect to said strand and movable through said mounting member to form an aperture therein at a piercing and assemblage station spaced longitudinally of the mounting member with respect to said strand feed station, said strand shearing means being adapted to deliver a severed reinforcing element to said last named station in alinement with the aperture formed in the mounting member, a plunger at said last named station for feeding the element into the aperture of the mounting member and positioning the same thereon, a pair of dies movable toward and from the mounting member at a position spaced longitudinally of the mounting member with respect to the piercing and element mounting station and forming a moulding station, the dies having a cavity defining the contour of the scoop to be formed on said mounting member, means for pressure injecting moulding material into the cavity at said station to form a scoop on the mounting and enveloping the preattached reinforcing element on said mounting member, said tape feeding means being adapted to feed the tape during a predetermined number of cycles of operations of the machine in intermittent feeds equal to the spacing between the first named stations, means for checking movement of said strand shearing means to aline the same with respect to the first and second named stations, and tensional means for actuating said shearing means in one direction.

5. A machine for producing reinforced scoops on mounting members, comprising means for guiding a mounting member through a predetermined path in the machine, means for intermittently feeding the mounting member at predetermined distances in the machine, means for feeding a strand into position adjacent the mounting member to define a strand feeding station, means at said station to receive a length of strand and to shear the strand to form a reinforcing element, a piercing tool spaced with respect to said strand and movable through said mounting member to form an aperture therein at a piercing and assemblage station spaced longitudinally of the mounting member with respect to said strand feed station, said strand shearing means being adapted to deliver a severed reinforcing element to said last named station in alinement with the aperture formed in the mounting member, a plunger at said last named station for feeding the element into the aperture of the mounting member and positioning the same thereon, a pair of dies movable toward and from the mounting member at a position spaced longitudinally of the mounting member with respect to the piercing and element mounting station and forming a moulding station, the dies having a cavity defining the contour of the scoop to be formed on said mounting member, means for pressure injecting moulding material into the cavity at said station to form a scoop on the mounting and enveloping the preattached reinforcing element on said mounting member, said tape feeding means being adapted to feed the tape during a predetermined number of cycles of operations of the machine in intermittent feeds equal to the spacing between the first named stations, means for checking movement of said strand shearing means to aline the same with respect to the first and second named stations, and said shearing means, piercing tool and plunger being all air actuated in one direction and having spring means for operating the same in the opposite direction.

6. A machine of the class described, comprising means for guiding and intermittently feeding an elongated mounting through a predetermined path in the machine, a strand delivery and shearing station, a combined piercing and element delivery station and a casting station spaced longitudinally of the path of feed of said mounting, said first named station comprising an apertured block with means for intermittently feeding a strand into and projecting the same from said block a predetermined distance into a shearing member, said member being movable over the surface of the block to shear an element from the strand and to deliver said element to said second named station, a prong movable toward and from the mounting at said second named station to pierce the mounting to form an aperture therein, a plunger arranged in axial alinement with said prong, means for actuating said plunger to feed the element supported by said shearing member, in axial alinement with the plunger into the aperture of said mounting, a pair of dies movable toward the mounting, at spaced relation to the piercing station forming said casting station, the dies forming a cavity around at least part of said mounting and the element supported thereon, and means for pressure injecting casting material into the dies and onto the mounting and element in forming a casting on the mounting reinforced by said element.

7. A machine of the class described, comprising means for guiding and intermittently feeding an elongated mounting through a predetermined path in the machine, a strand delivery and shearing station, a combined piercing and element delivery station and a casting station spaced longitudinally of the path of feed of said mounting, said first named station comprising an apertured block with means for intermittently feeding a strand into and projecting the same from said block a predetermined distance into a shearing member, said member being movable over the surface of the block to shear an element from the strand and to deliver said element to said second named station, a prong movable toward and from the mounting at said second named station to pierce the mounting to form an aperture therein, a plunger arranged in axial alinement with said prong, means for actuating said plunger to feed the element supported by said shearing member, in axial alinement with the plunger into the aperture of said mounting, a pair of dies movable toward the mounting, at spaced relation to the piercing station forming said casting station, the dies forming a cavity around at least part of said mounting and the element supported thereon, means for pressure injecting casting material into the dies and onto the mounting and element in forming a casting on the mounting reinforced by said element, and the intermittent feed of the mounting being equal to the spacing between said first two stations in control of the formation of a predetermined number of equally spaced castings on the mounting in defining a predetermined length of a predeterminel product.

8. In die casting machines comprising a pair of dies movable toward and from each other and between which an elongated mounting is adapted to be positioned, the dies collectively forming a cavity around part of said mounting, means for pressure injecting casting material into the dies to form a casting on that part of the mounting disposed within the die cavity when the dies are in closed position, and means for intermittently feeding the mounting to position other portions of the mounting in the die cavity to form a successive series of castings, the combination therewith of means spaced longitudinally of the mounting for intermittently piercing the mounting and means for intermittently positioning a reinforcing element in each pierced portion of the mounting prior to the feeding of the mounting into position between said dies, said die cavity being adapted to receive therein said reinforcing element as well as said part of the mounting and to form said casting about said element.

9. In die casting machines comprising a pair of dies movable toward and from each other and between which an elongated mounting is adapted to be positioned, the dies collectively forming a cavity around part of said mounting, means for pressure injecting casting material into the dies to form a casting on that part of the mounting disposed within the die cavity when the dies are in closed position, and means for intermittently feeding the mounting to position succeeding portions of the mounting in the die cavity to form a successive series of castings, the combination therewith of means spaced longitudinally of the mounting for intermittently piercing a portion of the mounting, means for intermittently feeding a strand to a strand-shearing tool, a tool adjacent said piercing means for intermittently shearing a reinforcing strand element from said strand, means for moving said reinforcing element to a position in alinement with said pierced mounting portion, and means for positioning said reinforcing element in said pierced portion of the mounting prior to the feeding of the mounting into position between said dies, said die cavity being adapted to receive therein said reinforcing element as well as said part of the mounting and to form said casting about said element.

10. In machines for intermittently delivering predetermined longitudinally spaced sections of an elongated mounting to a forming station, means spaced longitudinally of the mounting in advance of the forming station for intermittently piercing the mounting and for positioning an element in the pierced portion of the mounting at intervals which define said spaced sections of the mounting, and said forming station having means for forming a predetermined product on said element.

11. In machines for intermittently delivering predetermined longitudinally spaced sections of an elongated mounting to a forming station, means spaced longitudinally of the mounting in advance of the forming station for intermittently piercing the mounting and for positioning an element in the pierced portion of the mounting at intervals which define said spaced sections of the mounting, said forming station having means for forming a predetermined product on said element, said piercing means defining a piercing station, and means at said piercing station for moving said element into the pierced portion of the mounting.

12. In machines for intermittently delivering predetermined longitudinally spaced sections of an elongated mounting to a forming station, means spaced longitudinally of the mounting in advance of the forming station for intermittently piercing the mounting and for positioning an element in the pierced portion of the mounting at intervals which define said spaced sections of the mounting, said forming station having means for forming a predetermined product on said element, said piercing means defining a piercing station, means at said piercing station for moving said element into the pierced portion of the mounting, means in advance of said piercing station for forming said element, and means for actuating said last named means to deliver the element into position at the piercing station.

13. An automatic machine for producing separable fastener stringers having reinforced plastic scoops spaced longitudinally of one edge portion of a stringer tape comprising means for guiding and intermittently feeding a stringer tape through the machine in a predetermined path, means arranged in said path of movement of the tape for piercing predetermined spaced intervals of the tape in intermittent feed of said tape, means for forming a reinforcing strand of predetermined length, means in the path of movement of the tape for positioning said strand in the pierced portion of the tape, and means spaced with respect to said last named means longitudinally of the path of movement of the tape for forming a plastic scoop on the tape enveloping said strand.

14. An automatic machine for producing separable fastener stringers, having reinforced plastic scoops spaced longitudinally of one edge portion of a stringer tape comprising means for guiding and intermittently feeding a stringer tape through the machine in a predetermined path, means arranged in said path of movement of the tape for piercing predetermined spaced intervals of the tape in intermittent feed of said tape, means for forming a reinforcing strand of predetermined length, means in the path of movement of the tape for positioning said strand in the pierced portion of the tape, means spaced with respect to said last named means longitudinally of the path of movement of the tape for forming a plastic scoop on the tape enveloping said strand, and said strand forming means including means to deliver the strand for positioning in alinement with the pierced portion of the tape prior to actuation of the means for moving the strand onto the tape.

15. In a machine of the character described, a movable slide having spaced apertures, means for intermittently feeding a mounting longitudinally with respect to the movement of said slide in intermittently shifting the mounting spaces defined by the spacing of the apertures of said slide, means for feeding a workpiece into one of said apertures, means for simultaneously piercing the mounting in alinement with the other of said apertures, means to then move the slide to shear a reinforcing element from the workpiece and deliver the same to a position in alinement with said piercing means, means in alinement with said piercing means to move the element into the pierced portion of the mounting, and means spaced with respect to said piercing means for moulding a product which envelopes the reinforcing element on said mounting.

References Cited in the file of this patent

UNITED STATES PATENTS

| Number | Name | Date |
|---|---|---|
| 754,552 | Ellinwood | Mar. 15, 1904 |
| 2,031,959 | Kelley | Feb. 25, 1936 |
| 2,221,740 | Ulrich | Nov. 12, 1940 |
| 2,264,580 | Morin | Dec. 2, 1941 |